(12) United States Patent
Tsunematsu et al.

(10) Patent No.: US 11,912,878 B2
(45) Date of Patent: Feb. 27, 2024

(54) METHOD OF PRODUCING ORGANIC-INORGANIC HYBRID INFRARED ABSORBING PARTICLES AND ORGANIC-INORGANIC HYBRID INFRARED ABSORBING PARTICLES

(71) Applicants: SUMITOMO METAL MINING CO., LTD., Tokyo (JP); NATIONAL UNIVERSITY CORPORATION YAMAGATA UNIVERSITY, Yamagata (JP)

(72) Inventors: Hirofumi Tsunematsu, Kagoshima (JP); Takeshi Chonan, Kagoshima (JP); Atsushi Tofuku, Tokyo (JP); Seigou Kawaguchi, Yamagata (JP); Naohiro Kobayashi, Yamagata (JP)

(73) Assignees: SUMITOMO METAL MINING CO., LTD., Tokyo (JP); NATIONAL UNIVERSITY CORPORATION YAMAGATA UNIVERSITY, Yamagata (JP)

( * ) Notice: Subject to any disclaimer, the term of this patent is extended or adjusted under 35 U.S.C. 154(b) by 269 days.

(21) Appl. No.: 17/413,653

(22) PCT Filed: Dec. 16, 2019

(86) PCT No.: PCT/JP2019/049252
§ 371 (c)(1),
(2) Date: Jun. 14, 2021

(87) PCT Pub. No.: WO2020/129919
PCT Pub. Date: Jun. 25, 2020

(65) Prior Publication Data
US 2022/0049105 A1    Feb. 17, 2022

(30) Foreign Application Priority Data

Dec. 18, 2018   (JP) .................................. 2018-236796
May 17, 2019   (JP) .................................. 2019-094032

(51) Int. Cl.
*C09C 3/10*    (2006.01)
*C01G 41/02*    (2006.01)
(Continued)

(52) U.S. Cl.
CPC ................ *C09C 3/10* (2013.01); *C01G 41/02* (2013.01); *C08F 2/08* (2013.01); *C08F 2/46* (2013.01); . *C08F 112/08* (2013.01); *C01P 2006/60* (2013.01)

(58) Field of Classification Search
CPC ... C09C 3/10; C01G 41/02; C08F 2/08; C08F 2/24; C08F 112/08; C01P 2006/60
See application file for complete search history.

(56) References Cited

U.S. PATENT DOCUMENTS 7,655,301 B2   2/2010   Chonan et al.
7,687,141 B2   3/2010   Yabuki
(Continued)

FOREIGN PATENT DOCUMENTS

CN    1468898    1/2004
CN    105400113   3/2016
(Continued)

OTHER PUBLICATIONS

International Search Report for PCT/JP2019/049252 dated Mar. 10, 2020.

*Primary Examiner* — Bijan Ahvazi
(74) *Attorney, Agent, or Firm* — IPUSA, PLLC

(57) ABSTRACT

A method of producing organic-inorganic hybrid infrared absorbing particles includes a dispersion liquid preparing
(Continued)

step of preparing a dispersion liquid containing infrared absorbing particles, a dispersant, and a dispersion medium; a dispersion medium removing step of removing the dispersion medium from the dispersion liquid by an evaporation; a raw material mixture liquid preparing step of preparing a raw material mixture liquid containing the infrared absorbing particles collected after the dispersion medium removing step, a coating resin material, an organic solvent, an emulsifying agent, water, and a polymerization initiator; a stirring step of stirring the raw material mixture liquid while cooling; and a polymerizing step of polymerizing the coating resin material after deoxygenation treatment which reduces an amount of oxygen in the raw material mixture liquid.

13 Claims, 6 Drawing Sheets

(51) Int. Cl.
  *C08F 2/08* (2006.01)
  *C08F 2/46* (2006.01)
  *C08F 112/08* (2006.01)

(56) References Cited

U.S. PATENT DOCUMENTS

| | | | |
|---|---|---|---|
| 8,083,847 | B2 | 12/2011 | Takeda et al. |
| 8,318,051 | B2 | 11/2012 | Adachi |
| 10,208,212 | B2 | 2/2019 | Tsuruta et al. |
| 10,359,171 | B2 | 7/2019 | Wake |
| 10,384,423 | B2 | 8/2019 | Yabuki et al. |
| 2015/0372037 | A1 | 12/2015 | Tomeba |
| 2016/0067932 | A1 | 3/2016 | Chuang et al. |
| 2017/0363788 | A1 | 12/2017 | Fukuda et al. |
| 2020/0283586 | A1* | 9/2020 | Tsunematsu ............... C08J 3/22 |
| 2020/0399438 | A1* | 12/2020 | Tsunematsu ............ C09C 3/063 |

FOREIGN PATENT DOCUMENTS

| | | |
|---|---|---|
| CN | 107573725 | 1/2018 |
| JP | 2008-024902 | 2/2008 |
| JP | 2008-127511 | 6/2008 |
| JP | 2011-001551 | 1/2011 |
| JP | 2011-012233 | 1/2011 |
| JP | 2012-118295 | 6/2012 |
| JP | 2013-064042 | 4/2013 |
| JP | 2015-066763 | 4/2015 |
| WO | 2005/037932 | 4/2005 |
| WO | 2005/087680 | 9/2005 |
| WO | 2006/049025 | 5/2006 |
| WO | 2013/187350 | 12/2013 |
| WO | 2015/107939 | 7/2015 |
| WO | 2016/052091 | 4/2016 |
| WO | 2016/104375 | 6/2016 |
| WO | 2016/199682 | 12/2016 |
| WO | 2017/026211 | 2/2017 |
| WO | 2019/022003 | 1/2019 |

* cited by examiner

METHOD OF PRODUCING ORGANIC-INORGANIC HYBRID INFRARED ABSORBING PARTICLES AND ORGANIC-INORGANIC HYBRID INFRARED ABSORBING PARTICLES

TECHNICAL FIELD

The present invention relates to a method of producing organic-inorganic hybrid infrared absorbing particles and organic-inorganic hybrid infrared absorbing particles.

BACKGROUND OF THE INVENTION

Infrared absorbing particles that absorb infrared light can be used for various applications, for example, a heat shielding film and the like. Therefore, various studies have been conducted.

For example, Patent Document 1 discloses fine particles of the infrared-shielding material containing the tungsten oxide fine particles and/or the tungsten oxide composite fine particles that are finely granulated to a particle size of not less than 1 nm and not more than 800 nm. The fine particles of the infrared-shielding material thus obtained are dispersed in a medium, and the fine particle dispersion of the infrared-shielding material can be produced, having excellent characteristics such as efficiently blocking a sunbeam, especially the light in the near-infrared region, while holding a transmittance in the visible region.

RELATED-ART DOCUMENT

Patent Document

Patent Document 1: International Publication No. WO 2005/037932

SUMMARY OF THE INVENTION

Problems to be Solved by the Invention

However, the inventors of the present invention have found that the infrared absorbing particles exhibit degraded infrared absorbing characteristics when exposed to a chemical environment such as high temperature acid or alkali.

One aspect of the present invention is to provide a method of producing organic-inorganic hybrid infrared absorbing particles that exhibit improved chemical resistance.

Means for Solving the Problem

In one aspect of the present invention, a method of producing organic-inorganic hybrid infrared absorbing particles includes a dispersion liquid preparing step of preparing a dispersion liquid containing infrared absorbing particles, a dispersant, and a dispersion medium; a dispersion medium removing step of removing the dispersion medium from the dispersion liquid by an evaporation; a raw material mixture liquid preparing step of preparing a raw material mixture liquid containing the infrared absorbing particles collected after the dispersion medium removing step, a coating resin material, an organic solvent, an emulsifying agent, water, and a polymerization initiator; a stirring step of stirring the raw material mixture liquid while cooling; and a polymerizing step of polymerizing the coating resin material after deoxygenation treatment which reduces an amount of oxygen in the raw material mixture liquid.

Effects of the Invention

In one aspect of the present invention, a method of producing organic-inorganic hybrid infrared absorbing particles having chemical resistance characteristics is provided.

DETAILED DESCRIPTION OF THE INVENTION

Figure 1:
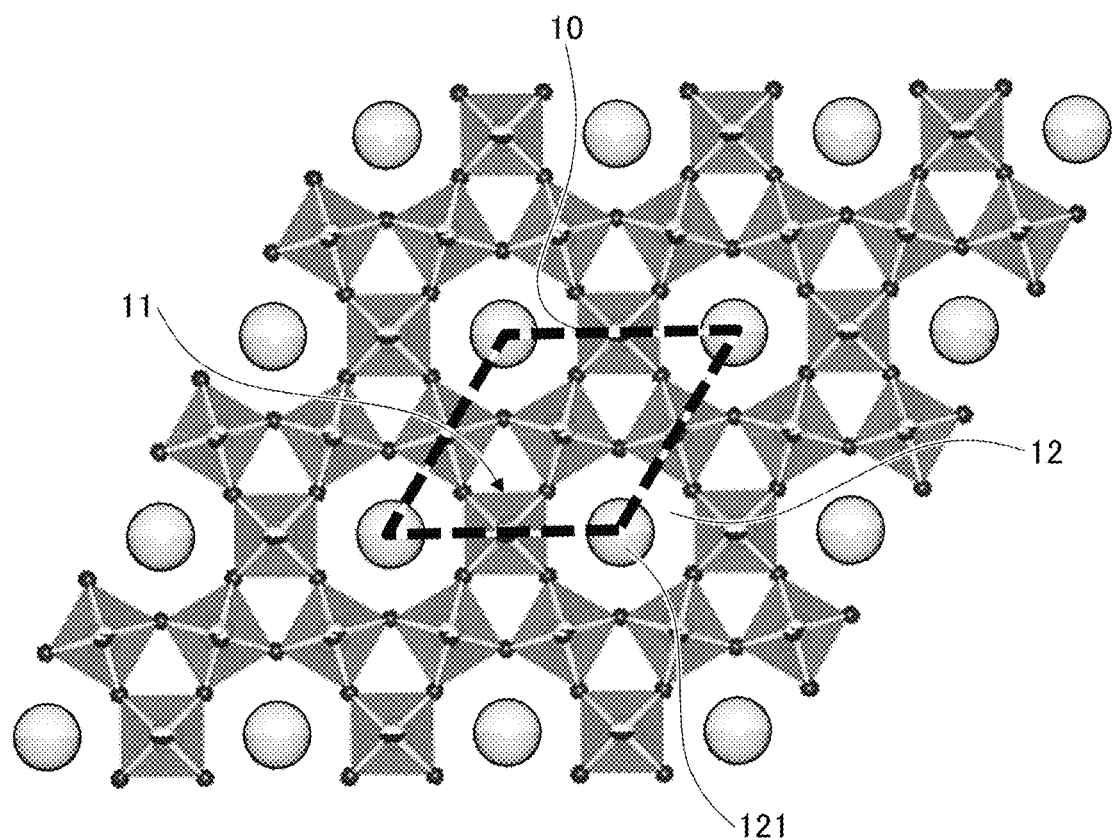
FIG. 1 is a schematic view of a crystal structure of a composite tungsten oxide having a hexagonal crystal.

[Method of Producing Organic-Inorganic Hybrid Infrared Absorbing Particles]

The inventors of the present invention have diligently investigated a method of producing infrared absorbing particles having chemical resistance characteristics. As a result, they found that adhering an organic material, such as a resin, directly to at least a portion of the surface of the infrared absorbing particles to form organic-inorganic hybrid infrared absorbing particles enables to provide chemical resistance characteristics to the infrared absorbing particles.

However, the infrared absorbing particles are usually inorganic materials, and the method of adhering an organic material, such as a resin, to at least a portion of the surface of the infrared absorbing particles was unknown. Accordingly, the inventors of the present invention have further investigated and found a method of producing organic-inorganic hybrid infrared absorbing particles in which an organic material can be adhered to the surface of the infrared absorbing particles, thereby completing the present invention.

In the present embodiment, a configuration example of a method of producing organic-inorganic hybrid infrared absorbing particles will be described.

The method of producing the organic-inorganic hybrid infrared absorbing particles of the present embodiment may include the following steps.

The steps include:
- a dispersion liquid preparation step of preparing a dispersion liquid containing infrared absorbing particles, a dispersant, and a dispersion medium;
- a dispersion medium removing step of removing the dispersion medium from the dispersion liquid by an evaporation;
- a raw material mixture preparation step of preparing a raw material mixture containing the infrared absorbing particles collected after the step of removing the dispersion medium from the dispersion liquid by the evaporation, a coating resin material, an organic solvent, an emulsifying agent, water, and a polymerization initiator;
- a stirring step of stirring the raw material mixture while cooling; and
- a polymerization step of polymerizing the coating resin material after reducing an amount of oxygen in the raw material mixture.

Hereinafter, each step will be described below.

(1) Dispersion Liquid Preparation Step

In the dispersion liquid preparation step, a dispersion liquid containing infrared absorbing particles, a dispersing agent, and a dispersion medium is prepared.

Each material suitable for preparing the dispersion liquid in the dispersion liquid preparation step will be described.

(a) Infrared Absorbing Particles

In the method of producing the organic-inorganic hybrid infrared absorbing particles according to the present embodiment, various types of infrared absorbing particles, which are required to enhance the chemical resistance characteristics, for example, acid resistance and alkali resistance, can be used as the infrared absorbing particles. For example, the infrared absorbing particles including various materials containing free electrons are preferably used as the infrared absorbing particles used in the method of producing the organic-inorganic hybrid infrared absorbing particles according to the present embodiment, and the infrared absorbing particles including various inorganic materials containing free electrons can be more preferably used.

As the infrared absorbing particles, it is particularly preferable to use the infrared absorbing particles including one or more kinds selected from the oxygen deficient tungsten oxide and the composite tungsten oxide. In this case, specifically, the infrared absorbing particles are one or more selected from, for example, a tungsten oxide represented by the general formula $W_yO_z$ (W: tungsten, O: oxygen, wherein $2.2 \leq z/y \leq 2.999$) and a composite tungsten oxide represented by the general formula $M_xW_yO_z$ (elemental M is one or more metals selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Sb, B, F, P, S, Se, Br, Te, Ti, Nb, V, Mo, Ta, Re, Be, Hf, Os, Bi, and I; wherein $0.001 \leq x/y \leq 1$; and $2.0 \leq z/y \leq 3.0$).

Generally, materials containing free electrons are known to exhibit a reflective absorption response to electromagnetic waves around the region of wavelengths from 200 nm to 2600 nm of sunlight by plasma vibration. Therefore, various materials containing free electrons can be suitably used as infrared absorbing particles. The infrared absorbing particles are preferably smaller than, for example, the wavelength of light, thereby reducing the geometric scattering of the visible light region (from 380 nm to 780 nm) and obtaining particularly high transparency for the visible light region.

Note herein that "transparency" is used to indicate "low scattering and high transmission with respect to light in the visible light range".

In general, effective free electrons are not present in tungsten oxide ($WO_3$), the absorption reflection characteristics in the infrared region are low, and it is not effective as infrared absorbing particles.

In contrast, the composite tungsten oxide containing an oxygen deficient $WO_3$ or containing $WO_3$ with a positive element such as Na added is known to be a conductive material and a material with free electrons. Analysis of a single crystal of these materials having free electrons suggests a response of the free electrons to light in the infrared region.

According to the inventors of the present invention, a tungsten oxide or a composite tungsten oxide has a particularly effective region as an infrared absorbing material in a particular portion of the composition range of the tungsten and oxygen. The tungsten oxide or the composite tungsten oxide is transparent in the visible light range and exhibits particularly strong absorption in the infrared region.

Therefore, the tungsten oxide and the composite tungsten oxide, which are materials of the infrared absorbing particles that can be suitably used in the method of producing the organic-inorganic hybrid infrared absorbing particles according to the present embodiment, will be further described below.

(Tungsten Oxide)

The tungsten oxide is represented by the general formula $W_yO_z$, where W is tungsten, O is oxygen, and $2.2 \leq z/y \leq 2.999$.

In the tungsten oxide represented by the general formula $W_yO_z$, the composition range of the tungsten and the oxygen is preferably less than 3 by the composition ratio (z/y) of the oxygen to the tungsten, and more preferably $2.2 \leq z/y \leq 2.999$. In particular, the composition ratio is further preferably $2.45 \leq z/y \leq 2.999$.

If the composition ratio of z/y is 2.2 or more, the formation of a crystalline phase of $WO_2$ in the tungsten oxide, which is undesirable, can be avoided, and chemical stability as a material can be obtained. Therefore, particularly effective infrared absorbing particles can be obtained.

Further, when the composition ratio of z/y is preferably less than 3 and more preferably 2.999 or less, a particularly sufficient number of free electrons can be generated in order to enhance the absorption reflection characteristics of the infrared region, and highly efficient infrared absorbing particles can be obtained.

In addition, the so-called "magnéli phase", which has a composition ratio of $2.45 \leq z/y \leq 2.999$, is chemically stable and has excellent light absorption characteristics in the near-infrared region, and thus can be more preferably used as an infrared absorbing material. Therefore, the composition ratio of z/y is further preferably $2.45 \leq z/y \leq 2.999$ as described above.

(Composite Tungsten Oxide)

The composite tungsten oxide is a compound in which the element M, which will be described later, is added to the $WO_3$ described above.

The composite tungsten oxide formed by adding element M generates free electrons in $WO_3$, and strong absorption characteristics derived from the free electrons appear in the near-infrared region in particular. Therefore, the composite tungsten oxide becomes effective as near-infrared absorbing particles at a wavelength of about 1000 nm.

That is, with respect to the $WO_3$, the composite tungsten oxide capable of controlling the oxygen amount and adding the element M that generates free electrons can impart highly efficient infrared absorption characteristics. When, with respect to $WO_3$, the general formula of composite tungsten oxide capable of controlling the oxygen amount and adding the element M that generates free electronsis represented as $M_xW_yO_z$, the relationship preferably satisfies $0.001 \le x/y \le 1$ and $2.0 \le z/y \le 3.0$. M in the above general formula denotes the element M, W denotes tungsten and O denotes oxygen, respectively.

As described above, when the composition ratio of x/y representing the added amount of element M is 0.001 or more, a particularly sufficient number of free electrons are generated in the composite tungsten oxide, and highly efficient infrared absorption characteristics can be obtained. The more element M is added, the more free-electrons are supplied, and the efficiency of infrared absorption increases. However, when the composition ratio of x/y is about 1, the effect is saturated. In addition, the composition ratio of x/y is preferably not more than 1 to avoid generating an impurity phase in the infrared absorbing particles containing the composite tungsten oxide.

The element M is preferably one or more elements selected from H, He, an alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I.

From the viewpoint of particularly increasing stability in $M_xW_yO_z$, the element M is one or more elements selected from the group consisting of an alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Sb, Sb, B, F, P, S, Se, Br, Te, Ti, Nb, V, Mo, Ta, and Re. From the viewpoint of improving the optical characteristics and weather resistance of the infrared absorbing particles including the composite tungsten oxide, the element M is more preferably one or more elements selected from an alkali metal, alkaline earth metal element, transition metal element, group 4B element, and group 5B element.

As for the composition ratio of z/y, which indicates the amount of oxygen added, the same configuration applies in the composite tungsten oxides represented by $M_xW_yO_z$ as in the tungsten oxides represented by $W_yO_z$ described above. In addition, when the composition ratio of z/y is 3.0, the free electrons supplied by the added amount of the element M described above are also provided. Therefore, the composition ratio of $2.0 \le z/y \le 3.0$ is preferably used, $2.2 \le z/y \le 3.0$ is more preferably used, and $2.45 \le z/y \le 3.0$ is even more preferably used.

Furthermore, when the composite tungsten oxide has a hexagonal crystal structure, the transmission of light in the visible region by the infrared absorbing particles containing the composite tungsten oxide is improved, and the absorption of light in the infrared region is improved. The hexagonal crystal structure of the composite tungsten oxide is explained by referring to a schematic plan view in FIG. 1.

FIG. 1 illustrates a projection diagram of the crystal structure of the composite tungsten oxide having a hexagonal structure viewed in the (001) direction, with the dotted line representing the unit lattice 10.

In FIG. 1, six octahedrons 11 formed by $WO_6$ units are assembled to form a hexagonal void 12. In the void 12, an element 121, which is the element M, is disposed to form a unit, and a large number of these units are assembled to form a hexagonal crystal structure.

In order to improve the transmission of light in the visible light region and the absorption of light in the infrared region, the composite tungsten oxide may include the unit structure described in FIG. 1. The composite tungsten oxide may be crystalline or amorphous.

When positive ions of the element M are added to and are present in the hexagonal voids, light transmission in the visible light region is improved, and light absorption in the infrared region is improved. Generally, when the element M having a large ion radius is added, the hexagonal crystal is easily formed. Specifically, when one or more elements selected from Cs, K, Rb, Tl, In, Ba, Li, Ca, Sr, Fe, and Sn are added as the element M, hexagonal crystals are easily formed. Elements other than the above-described elements may be used as long as the element M as described above is present in the hexagonal voids formed by $WO_6$ units. The element M is not limited to the above-described elements.

The added amount of the element M is preferably 0.2 or more and 0.5 or less and more preferably 0.33 in the composition ratio of x/y in the general formula because the composite tungsten oxide having the hexagonal crystal structure has a uniform crystal structure. When the composition ratio of x/y is 0.33, the element M described above is positioned in all of the hexagonal voids.

In addition to hexagonal crystals, infrared absorbing particles including tetragonal and cubic crystal composite tungsten oxides also have sufficiently effective infrared absorbing properties. Depending on the crystal structure, the absorption position of the infrared region tends to change, and the absorption position tends to shift toward the long wavelength in the order of cubic<square<hexagonal crystal. In addition, for lowest light absorption in the visible light region, the order is from hexagonal, tetragonal, and cubic crystals. Thus, hexagonal composite tungsten oxide is preferably used for applications that transmit more visible light and block more infrared light. However, the tendency of the optical characteristics described herein is not limited to the present invention, but varies depending on the type, amount, and amount of oxygen of the additive element.

The infrared absorbing particles containing tungsten oxide and composite tungsten oxide absorb a large amount of light in the near-infrared region, especially at wavelengths of about 1,000 nm, so that many of the transmitted colors change from blue to green.

In addition, the dispersion particle size of the infrared absorbing particles can be selected depending on the purpose of use.

First, for applications where transparency is desired, the infrared absorbing particles preferably have a dispersion particle size of 800 nm or less. This is because particles with a dispersion particle size of 800 nm or less do not completely block the light by scattering, and can maintain visibility in the visible light range, while at the same time maintaining transparency efficiently. In particular, when emphasizing transparency of the visible light region, further reduction of scattering by the particles is preferred.

When emphasizing the reduction of scattering by particles, the dispersion particle size is preferably 200 nm or less, and more preferably 100 nm or less. If the dispersion particle size of the particles is small, the scattering of light in the visible light range from 400 nm and more to 780 nm or less due to geometric scattering or Mie scattering decreases. As a result, it becomes possible to prevent the infrared absorbing film from becoming frosted glass and losing clear transparency. That is, when the dispersion particle size is 200 nm or less, the above-described geometric scattering or Mie scattering decreases, and the scattering region becomes a Rayleigh scattering region. In a Rayleigh scattering region, the scattered light proportionally decreases to the sixth power of the particle size, so that the scattering decreases as the dispersion particle size decreases, thereby improving transparency.

Furthermore, when the dispersion particle size is 100 nm or less, very little scattered light is generated, which is preferable. In order to avoid light scattering, smaller dispersion particle size is preferable.

The lower limit value of the dispersion particle size of the infrared absorbing particles is not particularly limited. The dispersion particle size is preferably 1 nm or more, because infrared absorbing particles can be easily manufactured in an industrial manner with such particle size.

When the dispersion particle size of the infrared absorbing particles is 800 nm or less, the infrared absorbing particles dispersion which dispersed the infrared absorbing particles in the medium may have a visible light transmittance of 85% or less and a haze of 30% or less. When the haze is 30% or less, it becomes possible to prevent the infrared absorbing particles dispersion from becoming frosted glass and losing clear transparency, and especially clear transparency can be obtained.

The dispersion particle size of infrared absorbing particles can be measured using an ELS-8000 manufactured by Otsuka Electronics Co., Ltd. based on the dynamic light scattering method.

In addition, from the viewpoint of exerting the excellent infrared absorption characteristics, the crystallite diameter of the infrared absorbing particle is preferably 1 nm or more and 200 nm or less, more preferably 1 nm or more and 100 nm or less, and further preferably 10 nm or more and 70 nm or less. X-ray diffraction pattern measurement by powder X-ray diffraction ($\theta$-$2\theta$ method) and analysis by Rietvelt method can be used for crystallite diameter measurement. The X-ray diffraction pattern can be measured using, for example, a powder X-ray diffraction device "X'Pert-PRO/MPD" manufactured by Malvern Panalytical Ltd., Spectris.

(b) Dispersant

A dispersant is used to hydrophobize the surface of the infrared absorbing particles. The dispersant can be selected according to a dispersion system, which is a combination of infrared absorbing particles, dispersion medium, resin raw material for coating, and the like. Among them, a dispersant having one or more functional groups selected from an amino group, a hydroxyl group, a carboxyl group, a sulfo group, a phospho group, or an epoxy group as a functional group may be preferably used. When the infrared absorbing particles are tungsten oxides or composite tungsten oxides, the dispersant preferably has an amino group as a functional group.

More preferably, the dispersant is an amine compound having an amino group as a functional group as described above. Also, the amine compound is more preferably a tertiary amine.

The dispersant is preferably a polymeric material because the polymeric material is used to hydrophobize the surface of the infrared absorbing particles. Therefore, it is preferable that the dispersant has one or more kinds selected from, for example, a long-chain alkyl group and a benzene ring. A polymeric dispersant is more preferably used, in which the polymeric dispersant has a copolymer of styrene capable of being used as a coating resin material on the side chain and 2-(dimethylamino)ethyl methacrylate which is a tertiary amine. The long chain alkyl group is preferably 8 or more carbons. For example, a dispersant that is a polymeric material and an amine compound may be used.

The amount of the dispersant to be added is not particularly limited, and can be freely selected. The suitable amount of dispersant to be added may be selected depending on the dispersant, the type of infrared absorbing particles, the specific surface area of the infrared absorbing particles, and the like. For example, when the amount of the dispersant to be added is 10 parts by weight or more and 500 parts by weight or less with respect to 100 parts by weight of the infrared absorbing particles, it is preferable, because preparation of dispersion liquid in a good dispersion state becomes easy. The amount of the dispersant to be added is more preferably 10 parts by mass or more and 100 parts by mass or less with respect to the 100 parts by mass of the infrared absorbing particles, and is further preferably 20 parts by mass or more and 50 parts by mass or less.

(c) Dispersion Medium

The dispersion medium may be a dispersion liquid in which the infrared absorbing particles and the dispersant described above are dispersed. For example, a variety of organic compounds may be used.

As the dispersion medium, for example, one or more organic compounds selected from the aromatic hydrocarbons, such as toluene and xylene, can be preferably used.

In the dispersion liquid preparation step, the dispersion liquid can be prepared by mixing the infrared absorbing particles, the dispersant, and the dispersion medium. However, it is preferable to crush the infrared absorbing particles to reduce the size of the dispersion particle of the infrared absorbing particles so as to disperse the particles uniformly in the dispersion liquid at the time of mixing.

A mixing and milling the infrared absorbing particles, the dispersant, and the dispersion medium are not particularly limited, but one or more mixing and milling methods selected from, for example, a bead mill, a ball mill, a sand mill, a paint shaker, an ultrasonic homogenizer, and the like can be used. Particularly, the mixing is more preferably medium stir millings, such as bead milling, ball milling, sand milling, paint shaker, and the like, using a medium such as a bead, a ball, or an Ottawa sand. This is because the infrared absorbing particle size can be determined to be a desired dispersion particle size in a short time through stir milling of the medium, and it is preferable from the viewpoint of productivity and preventing contamination of impurities.

(2) Dispersion Medium Removing Step

In the dispersion medium removing step, the dispersion medium can be evaporated and dried from the dispersion liquid.

In the dispersion medium removing step, it is preferable that the dispersion medium is sufficiently evaporated from the dispersion liquid so that the infrared absorbing particles can be collected.

A method of evaporating the dispersion medium is not particularly limited, but for example, a dryer such as an oven, a vacuum flow dryer such as an evaporator, a vacuum crusher, a spray dryer, or the like can be used.

In addition, the degree to which the dispersion medium is evaporated is not particularly limited, but it is preferable that the content of the dispersion medium is sufficiently reduced so as to obtain the infrared absorbing particles in powder form, for example, after the dispersion medium removing step.

By evaporating the dispersion medium, the dispersant is adhered to the infrared absorbing particles. Then, the infrared absorbing particles with hydrophobized surface can be obtained. Therefore, the adhesion between the hydrophobized infrared absorbing particles and the coating resin, which is polymerized by the coating resin raw material, is increased. As a result, the coating resin can be adhered to at least a portion of the surface of the infrared absorbing particles by the polymerization process to be described later.

(3) Raw Material Mixture Preparation Step

In the raw material mixture preparation step, the raw material mixture can be prepared by mixing the infrared absorbing particles collected after the dispersion medium removing step with the coating resin raw material, the organic solvent, the emulsifying agent, water, and the polymerization initiator.

In some cases, the infrared absorbing particles collected after the dispersion medium removing step may have the dispersant on the surface of the infrared absorbing particles, resulting in a formation of dispersant-containing infrared absorbing particles. Therefore, when the dispersant is adhered to the infrared absorbing particles as described above, the dispersant-containing infrared absorbing particles collected after the dispersion medium removing step are used as the infrared absorbing particles in the raw material mixture preparation step.

(a) Coating Resin Material

The coating resin raw material is polymerized in the polymerization step described below to form a coating resin that adheres to at least a portion of the surface of the infrared absorbing particles. Therefore, various monomers and the like capable of forming the desired coating resin can be selected as the raw material of the coating resin.

The coating resin after polymerization is not particularly limited, and may be one or more resins selected from, for example, a thermoplastic resin, a thermosetting resin, a photocurable resin, or the like.

Examples of the thermoplastic resin include polyester resin, polycarbonate resin, acrylic resin, polystyrene resin, polyamide resin, vinyl chloride resin, olefin resin, fluorine resin, polyvinyl acetate resin, thermoplastic polyurethane resin, acrylonitrile butadiene styrene resin, polyvinyl acetal resin, acrylonitrile styrene copolymer resin, ethylene vinyl acetate copolymer resin, and the like.

Examples of the thermosetting resin include phenolic resin, epoxy resin, melamine resin, urea resin, unsaturated polyester resin, alkyd resin, thermosetting polyurethane resin, polyimide resin, silicone resin, and the like.

The photocurable resin may include, for example, a resin cured by irradiation with one of ultraviolet light, visible light, or infrared light.

The coating resin preferably contains one or more resins selected from polyester resin, polycarbonate resin, acrylic resin, polystyrene resin, polyamide resin, vinyl chloride resin, olefin resin, fluorine resin, polyvinyl acetate resin, polyurethane resin, acrylonitrile butadiene styrene resin, polyvinyl acetal resin, acrylonitrile-styrene copolymer resin, ethylene-vinyl acetate copolymer resin, phenol resin, epoxy resin, melamine resin, urea resin, unsaturated polyester resin, alkyd resin, polyimide resin, silicone resin. Both the thermoplastic polyurethane and the thermosetting polyurethane may be used as the polyurethane resin.

As the coating resin, a photocurable resin may also be preferably used. As the photocurable resin, a resin that is cured by irradiation with one of ultraviolet light, visible light, or infrared light as described above, may be preferably used.

Among them, the coating resin is preferably a resin that can be applied using a mini-emulsion polymerization method, and for example, the coating resin preferably contains polystyrene resin. When the coating resin is polystyrene, styrene may be used as the raw material of the coating resin.

Multifunctional vinyl monomers such as divinylbenzene, ethylene glycol dimethacrylate and the like can also be added as crosslinking agents.

(b) Organic Solvents

The organic solvent is not particularly limited, and any non-aqueous solvent may be used. Among them, an organic solvent with low molecular weight is preferably used. Examples of organic solvents include one or more organic solvents selected from long-chain alkyl compounds such as hexadecane; alkyl methacrylate having a long chain of alkyl moieties such as dodecyl methacrylate, stearyl methacrylate, and the like; higher alcohols such as cetyl alcohol and the like; and oils such as olive oil.

As the organic solvent, long chain alkyl compounds are particularly preferably used, and hexadecane is even more preferably used.

(c) Emulsifying Agent

An emulsifying agent is not particularly limited. Examples of emulsifying agents include a surfactant, cationic, anionic, nonionic, and the like.

Examples of cationic emulsifying agents include alkylamine salts, quaternary ammonium salts, and the like.

Examples of anionic emulsifying agents include acid salts, ester salts, and the like.

Examples of nonionic emulsifying agents include various esters, various ethers, various ester ethers, alkanolamides, and the like.

As an emulsifying agent, for example, one or more kinds selected from the above-described material can be used.

Among them, a cationic emulsifying agent, that is, a cationic surfactant is preferably used from the viewpoint that the infrared absorbing particles particularly easily form organic-inorganic hybrid infrared absorbing particles.

In particular, when an amine compound is used as a dispersing agent, one or more cationic compounds selected from dodecyltrimethylammonium chloride (DTAC), cetyltrimethylammonium chloride (CTAC), or the like is preferably used as the emulsifying agent.

When an amine compound is used as a dispersant, it may be difficult to form organic-inorganic hybrid infrared absorbing particles by using sodium dodecyl sulfate (SDS), which is an anionic emulsifying agent. In preparing the raw material mixture, the emulsifying agent may be added, for example, to water to be added at the same time, and may be added as an aqueous solution. At this time, the emulsifying agent is preferably added as the aqueous solution that is adjusted so that the concentration is 1 to 10 times of the critical micelle concentration (CMC).

(d) Polymerization Initiator

The polymerization initiator is not particularly limited. Examples of the polymerization initiators include one or more initiators selected from a variety of polymerization initiators, such as a radical polymerization initiator, an ion polymerization initiator, and the like.

Examples of radical polymerization initiators include azo compounds, dihalogens, organic peroxides, and the like. In addition, radical polymerization initiators include redox initiators which are combinations of an oxidizing agent with a reducing agent, such as a combination of hydrogen peroxide and iron (II) salts, persulfate and sodium bisulfite.

Examples of ion polymerization initiators include nucleophiles such as n-butyllithium and the like, electrophiles such as protonic acids, Lewis acids, halogen molecules, carbocations, and the like.

As examples of polymerization initiators, one or more initiators selected from 2,2'-azobis isobutyronitrile (AIBN), potassium peroxodisulfate (KPS), 2,2'-azobis (2-methylpropionamidine) dihydrochloride (V-50), 2,2'-azobis (2-methyl-N-(2-hydroxyethyl) propionamidine) (VA-086), and the like can be suitably used.

In preparing the raw material mixture, the polymerization initiator may be added to an organic or aqueous phase, depending on the type thereof. For example, when 2,2'-azobisisobutyronitrile (AIBN) is used, the polymerization initiator may be added to the organic phase. When potassium peroxodisulfate (KPS) or 2,2'-azobis (2-methylpropionamidine) dihydrochloride (V-50) is used, the polymerization initiator may be added to the aqueous phase.

In the raw material mixture preparation step, it is sufficient to prepare the raw material mixture by mixing the infrared absorbing particles collected after the dispersion medium removing step, the coating resin raw material, the organic solvent, the emulsifying agent, water, and the polymerization initiator. Therefore, the procedure for preparing the raw material mixture is not particularly limited. However, for example, a mixture containing an emulsifying agent may be prepared in advance as the water phase. In addition, as the organic phase, a mixture, in which the coating resin raw material and the infrared absorbing particles collected after the dispersing medium removing step is dispersed in the organic solvent, can be prepared.

The polymerization initiator may be added to the aqueous phase or the organic phase depending on the type of the polymerization initiator used as described above.

Then, the organic phase is added to the aqueous phase and mixed to prepare the raw material mixture.

The organic phase is added to the aqueous phase and then sufficiently stirred so that the coating resin can be uniformly adhered to the surface of the infrared absorbing particles. That is, in addition to the mixing step, in which the infrared absorbing particles collected after the dispersion medium removing step, the coating resin raw material, the organic solvent, the emulsifying agent, water, and the polymerization initiator are mixed, the raw material mixture preparation step further preferably includes a stirring step which stirs the resulting mixture.

In the stirring step, stirring can be performed using, for example, a stirrer. In performing the stirring step, the degree of stirring is not particularly limited, but for example, the stirring is preferably performed so that oil droplets in water dispersed in the aqueous phase form the infrared absorbing particles contained in the coating resin raw material.

The amount of the polymerization initiator to be added is not particularly limited and may be freely selected. The additive amount of the polymerization initiator may be selected depending on the type of coating resin raw material, the size of oil droplet as the mini-emulsion, the ratio of the coating resin raw material to the infrared absorbing particles, and the like. For example, when the additive amount of the polymerization initiator is 0.01% by mol or more and 1000% by mol or less with respect to the coating resin raw material, the organic-inorganic hybrid infrared absorbing particles in which the infrared absorbing particles are sufficiently covered with the coating resin can be easily obtained, which is preferable. The additive amount of the polymerization initiator is more preferably 0.1% by mol or more and 200% by mol or less with respect to the coating resin raw material, and is further preferably 0.2% by mol or more and 100% by mol or less.

(4) Stirring Step

In the stirring step, the raw material mixture obtained in the raw material mixture preparation step can be stirred while cooling.

The degree of stirring in the stirring step is not particularly limited and may be freely selected. For example, the stirring is preferably performed so that the oil droplets in water become of a size for an oil-in-water (O/W) type emulsion in which the infrared absorbing particles contained in the coating resin raw material are dispersed in the aqueous phase, that is, a mini-emulsion in which the diameter is 50 nm or more and 500 nm or less.

The mini-emulsion is obtained by adding a substance that is poorly soluble in water, such as, a hydrophobic substance, to the organic phase, and applying a high shear force. As the hydrophobic substance, for example, the organic solvent described in the raw material mixture preparation step described above can be used. In addition, as a method of applying the high shear force, for example, a method of applying ultrasonic vibration to a raw material mixture by a homogenizer or the like is used.

In the stirring step, stirring is preferably performed while cooling the raw material mixture as described above. By cooling the raw material mixture, the mini-emulsion can be formed while preventing the polymerization reaction from proceeding.

The degree to which the raw material mixture is cooled is not particularly limited, but the raw material mixture is preferably cooled by, for example, an ice bath using a refrigerant having a temperature of 0° C. or less.

(5) Polymerization Step

In the polymerization step, the polymerization reaction of the coating resin raw material can be performed after a deoxygenation treatment to reduce the amount of oxygen in the raw material mixture.

In the polymerization step, the coating resin raw material is polymerized and the coating resin may be adhered to at least a portion of the surface of the infrared absorbing particles.

The conditions in the polymerization step are not particularly limited, but deoxygenation can be performed to reduce the amount of oxygen in the raw material mixture before starting the polymerization. The specific method of deoxygenation is not particularly limited, but includes a method of ultrasonic irradiation or a method of blowing an inert gas into the raw material mixture.

The specific conditions for performing the polymerization reaction is not particularly limited because the conditions can be freely selected according to the coating resin raw material added to the raw material mixture. The polymerization reaction can be proceeded, for example, by heating the raw material mixture or irradiating light of a predetermined wavelength.

According to the method of producing the organic-inorganic hybrid infrared absorbing particles of the embodiment described above, an organic material such as a resin can be adhered to at least a portion of the surface of the infrared absorbing particles to obtain the organic-inorganic hybrid infrared absorbing particles. Such a technique has been difficult in the past. Therefore, even when the organic-inorganic hybrid infrared absorbing particles are exposed to a chemical environment such as a high-temperature acid or alkali, prevention of the infrared absorbing particles from coming into direct contact with chemical components such as an acid or alkali is enabled, thereby allowing excellent chemical resistance and preventing the degradation of the infrared absorbing properties.

[Organic-Inorganic Hybrid Infrared Absorbing particles]

Organic-inorganic hybrid infrared absorbing particles of the present embodiment will be described. The organic-inorganic hybrid infrared absorbing particles in the present embodiment can be produced by the method described above of producing the organic-inorganic hybrid infrared absorbing particles. Accordingly, explanations of some of the matters already explained above will be omitted.

The organic-inorganic hybrid infrared absorbing particles according to the present embodiment include infrared absorbing particles and a coating resin covering at least a portion of the surface of the infrared absorbing particles.

Thus, the coating resin which covers at least a portion of a surface of infrared absorbing particles is adhered to the surface of the infrared absorbing particles. Such a technique has been difficult to perform in the past. Therefore, even when the infrared absorbing particles are exposed to a chemical environment such as a high-temperature acid or alkali, prevention of the infrared absorbing particles from coming into direct contact with chemical components such as an acid or alkali is enabled. Thereby, the organic-inorganic hybrid infrared absorbing particles of the present embodiment have excellent chemical resistance, and degrading of the infrared absorbing particles properties can be prevented.

As the infrared absorbing particles have already been described in the method of producing the organic-inorganic hybrid infrared absorbing particles, the description of the infrared absorbing particles will be omitted here. For example, the infrared absorbing particles including various materials having free electrons are preferably used, and the infrared absorbing particles including various inorganic materials having free electrons are more preferably used.

As the infrared absorbing particles, the infrared absorbing particles including one or more kinds selected from the oxygen deficient tungsten oxide and the composite tungsten oxide are preferably used. In this case, specifically, the infrared absorbing particles are one or more selected from, for example, a tungsten oxide represented by the general formula $W_yO_z$ (W: tungsten, O: oxygen, $2.2 \leq z/y \leq 2.999$) and a composite tungsten oxide represented by the general formula $M_xW_yO_z$ (elemental M is one or more elements selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Cd, Al, Ga, In, Tl, Si, Ge, Sn, Sb, B, F, P, S, Se, Br, Te, Ti, Nb, V, Mo, Ta, Re, Be, Hf, Os, Bi, and I, where $0.001 \leq x/y \leq 1$ and $2.0 \leq z/y \leq 3.0$).

Further, as the coating resin has already been described in the method of producing the organic-inorganic hybrid infrared absorbing particles, the description thereof will be omitted here. Examples of coating resins include one or more resins selected from a thermoplastic resin, a thermosetting resin, a photocurable resin, and the like. The coating resin particularly contains one or more resins selected from polyester resin, polycarbonate resin, acrylic resin, polystyrene resin, polyamide resin, vinyl chloride resin, olefin resin, fluorine resin, polyvinyl acetate resin, polyurethane resin, acrylonitrile butadiene styrene resin, polyvinyl acetal resin, acrylonitrile-styrene copolymer resin, ethylene-vinyl acetate copolymer resin, phenol resin, epoxy resin, melamine resin, urea resin, unsaturated polyester resin, alkyd resin, polyimide resin, and silicone resin. Both the thermoplastic polyurethane and the thermosetting polyurethane may be used as the polyurethane resin.

As the coating resin, a photocurable resin may be preferably used. The photocurable resin can use a resin that is cured by irradiation with one of ultraviolet light, visible light, or infrared light as described above.

Among them, the coating resin is preferably a resin that is suitable for use in the mini-emulsion polymerization step. For example, the coating resin is more preferably the resin that contains polystyrene resin.

According to the organic-inorganic hybrid infrared absorbing particles of the above-described present embodiment, a coating resin which is an organic material adheres to at least a portion of the surface of the infrared absorbing particles. Such a technique has been difficult to perform in the past. Therefore, even when the organic-inorganic hybrid infrared absorbing particles are exposed to a chemical environment such as a high-temperature acid or alkali, prevention of the infrared absorbing particles from coming into direct contact with chemical components such as an acid or alkali is enabled. Thereby, the organic-inorganic hybrid infrared absorbing particles of the present embodiment have excellent chemical resistance, and degrading of the infrared absorbing particles properties can be prevented.

[Organic-Inorganic Hybrid Infrared Absorbing Particle Dispersion]

As a method of applying the organic-inorganic hybrid infrared absorbing particles of the present embodiment, the particles can be dispersed in an appropriate medium to obtain the organic-inorganic hybrid infrared absorbing particles dispersion. That is, the organic-inorganic hybrid infrared absorbing particle dispersion in the present embodiment can include the organic-inorganic hybrid infrared absorbing particles described above and the medium, and can have a form in which the particles are dispersed in the medium.

UV-curable resin, thermosetting resin, electron beam curable resin, room temperature curable resin, thermoplastic resin, or the like can be selected as the medium according to the purpose. Specifically, examples of media include polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluorine resin, polycarbonate resin, acrylic resin, and polyvinyl butyral resin. These resins may be used alone or in combination. In addition to resin, glass may also be used.

The dispersion can be applied to a variety of substrates. The dispersion may also be used alone or as a substrate.

[Other Applications of Organic-Inorganic Hybrid Infrared Absorbing Particles]

Even when the organic-inorganic hybrid infrared absorbing particles of the present embodiment are exposed outdoors by being applied to windows, building materials, exterior walls of buildings, or materials of the agriculture, forestry, and fishery industries, water and the like do not appreciably penetrate into the organic-inorganic hybrid infrared absorbing particles because the infrared absorbing particles are covered with resin. Therefore, degradation of the infrared absorbing characteristics of the infrared absorbing particles can be mitigated, because alkali and acid components in water are unable to permeate the resin coating. The organic-inorganic hybrid infrared absorbing particles of the present embodiment can be incorporated into fibers for items such as clothing, structures such as outdoor windows and exterior walls of buildings, and materials of the agriculture, forestry and fisheries industries by applying or blending the infrared absorbing particles. As a result, the infrared absorbing particles can be utilized for infrared shielding by infrared absorption and photothermal conversion by infrared absorption.

Example

Although the present invention will be described in more detail below with reference to examples, the present invention is not limited thereto.

Example 1

Organic-inorganic hybrid infrared absorbing particles were produced and evaluated according to the following procedure.
(Dispersion Liquid Preparation Step)

In the dispersion liquid preparation step, a dispersion liquid containing infrared absorbing particles, a dispersant, and a dispersion medium was prepared.

The infrared absorbing particles were prepared from a composite tungsten oxide powder (YM-01 manufactured by Sumitomo Metal Mining Co., Ltd.) containing hexagonal cesium tungsten bronze ($Cs_{0.33}WO_z$, $2.0 \leq z \leq 3.0$), in which the ratio of the mass of cesium (Cs) and tungsten (W) is Cs/W=0.33.

A polymeric dispersant which is a copolymer of styrene and 2-(dimethylamino)ethyl methacrylate was used as the dispersant.

Toluene was used as the dispersion medium.

The mixture obtained by mixing 10% by weight of the infrared absorbing particles, 3% by weight of the dispersant, and 87% by weight of the dispersion medium was loaded into a paint shaker containing $ZrO_2$ beads having 0.3 mm φ, followed by being pulverized and dispersed for 10 hours to obtain the dispersion liquid of the $Cs_{0.33}WO_z$ particles according to Example 1.
(Dispersion Medium Removing Step)

Toluene, as the dispersion medium, was removed using an evaporator from the dispersion liquid of $Cs_{0.33}WO_z$ particles obtained in the dispersion liquid preparation step, and infrared absorbing particles were collected. The collected infrared absorbing particles were formed as dry powder of $Cs_{0.33}WO_z$ particles containing a polymeric dispersant. In other words, the dispersant resulting from the dispersion liquid preparation step was adhered to the surface of the collected infrared absorbing particles to form the infrared absorbing particles containing the dispersant.

The crystallite diameter of the collected infrared absorbing particles, that is, $Cs_{0.33}WO_z$ particles, was 16 nm.

In calculating the crystallite diameter, an X-ray diffraction pattern was first measured by an X-ray powder diffraction method (θ-2θ method) using an X-ray powder diffraction device (X'Pert-PRO/MPD manufactured by Malvern Panalytical Ltd., Spectris). Then, the crystal structure contained in the infrared absorbing particles was identified from the obtained X-ray diffraction pattern, and the crystallite diameter was calculated using the Rietvelt method.
(Raw Material Mixture Preparation Step)

An organic phase was formed by mixing 0.05 g of the infrared absorbing particles obtained in the dispersion medium removing step, 1.0 g of styrene as a coating resin raw material, 0.065 g of hexadecane as an organic solvent, and 0.0079 g of 2,2'-azobis isobutyronitrile as a polymerization initiator. The polymerization initiator was added so as to become a 0.5% by mol with respect to styrene.

In addition to the above-described organic phase, dodecyltrimethylammonium chloride, which is an emulsifying agent, was mixed with water to form an aqueous phase of 10 g. In forming the aqueous phase, dodecyltrimethylammonium chloride, which is an emulsifying agent, was added to water so that the concentration was 1.5 times the critical micelle concentration.

Subsequently, the organic phase was added to the aqueous phase to prepare a raw material mixture.
(Stirring Step)

High-power ultrasonic waves was applied to the raw material mixture prepared in the raw material mixture preparation step for 15 minutes while cooling in an ice bath to obtain a mini-emulsion.
(Polymerization Step)

After the stirring step, nitrogen bubbling was performed under an ice bath for 15 minutes to deoxygenate the raw material mixture.

Thereafter, the polymerization reaction of styrene was carried out by performing a heat treatment at 70° C. under a nitrogen atmosphere for 6 hours, and a dispersion liquid of organic-inorganic hybrid infrared absorbing particles was obtained.

Figure 2A:
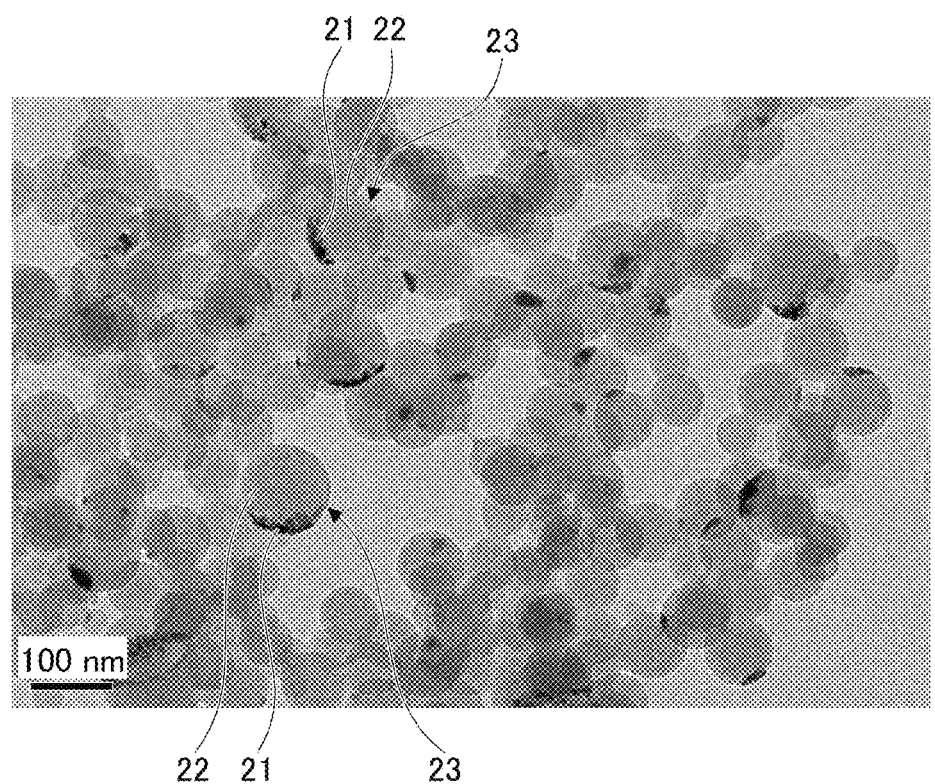
FIG. 2A is a transmission electron micrograph of organic-inorganic hybrid infrared absorbing particles obtained in Example 1.

The resulting dispersion liquid containing the organic-inorganic hybrid infrared absorbing particles was diluted and transferred to a microgrid to perform TEM observation of the transferred material. The TEM image is illustrated in FIG. 2A. From the TEM image, it was confirmed that particles 21 containing the composite tungsten oxide, which appear black, are infrared absorbing particles. The infrared absorbing particles were embedded in a coating 22 of the polystyrene coating resin, which appears gray. It was then confirmed that the organic-inorganic hybrid infrared absorbing particles 23 were formed.

The resulting dispersion liquid of organic-inorganic hybrid infrared absorbing particles (1 g) was added to 4 g of 0.01 mol/L sodium hydroxide solution held at 50° C., and the dispersion liquid was stirred for 60 minutes to perform an alkali resistance test.

Figure 2B:
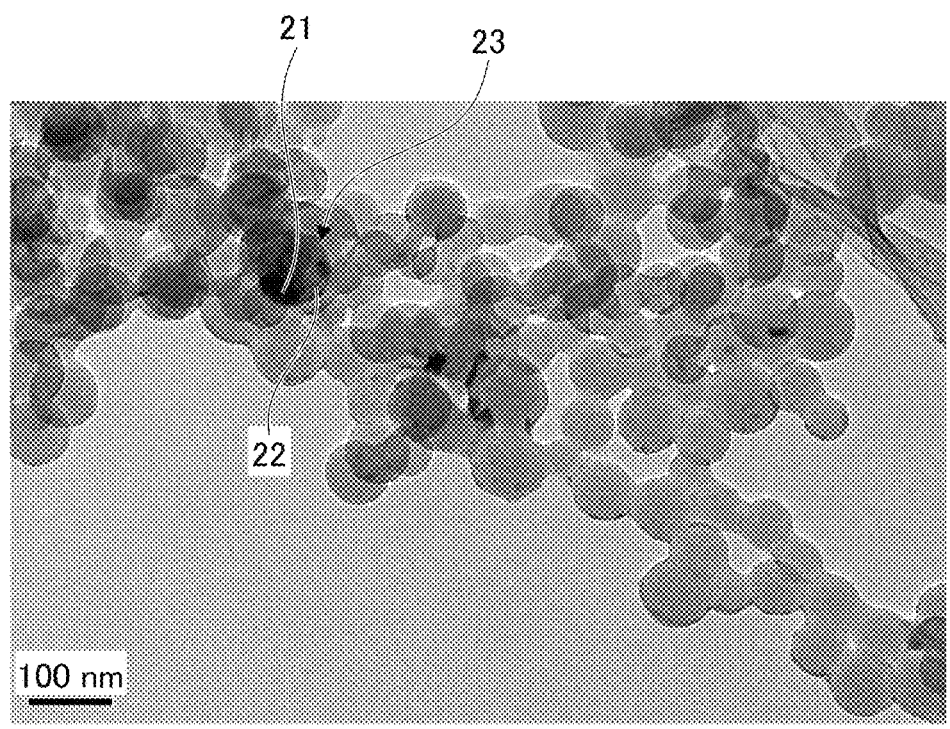
FIG. 2B is a transmission electron micrograph of the organic-inorganic hybrid infrared absorbing particles obtained in Example 1.

FIG. 2B illustrates the results of diluting the dispersion liquid containing the organic-inorganic hybrid infrared absorbing particles after the alkali resistance test, transferring it to the microgrid for TEM observation, and conducted the TEM observation of the transferred material. As illustrated in FIG. 2B, even after the alkali resistance test, it was confirmed that the particles 21 containing the composite tungsten oxide, which appear black, are infrared absorbing particles. The infrared absorbing particles were embedded in the coating 22 of the polystyrene coating resin, which appears gray. It was confirmed that the organic-inorganic hybrid infrared absorbing particles 23 were formed.

Example 2

The dispersion liquid of the organic-inorganic hybrid infrared absorbing particles of Example 2 was obtained in the same manner as Example 1, except that the additive amount of 2,2'-azobis isobutyronitrile, which is the polymerization initiator, was changed to a ratio equivalent to 2.0% by mol with respect to styrene.

Figure 3:
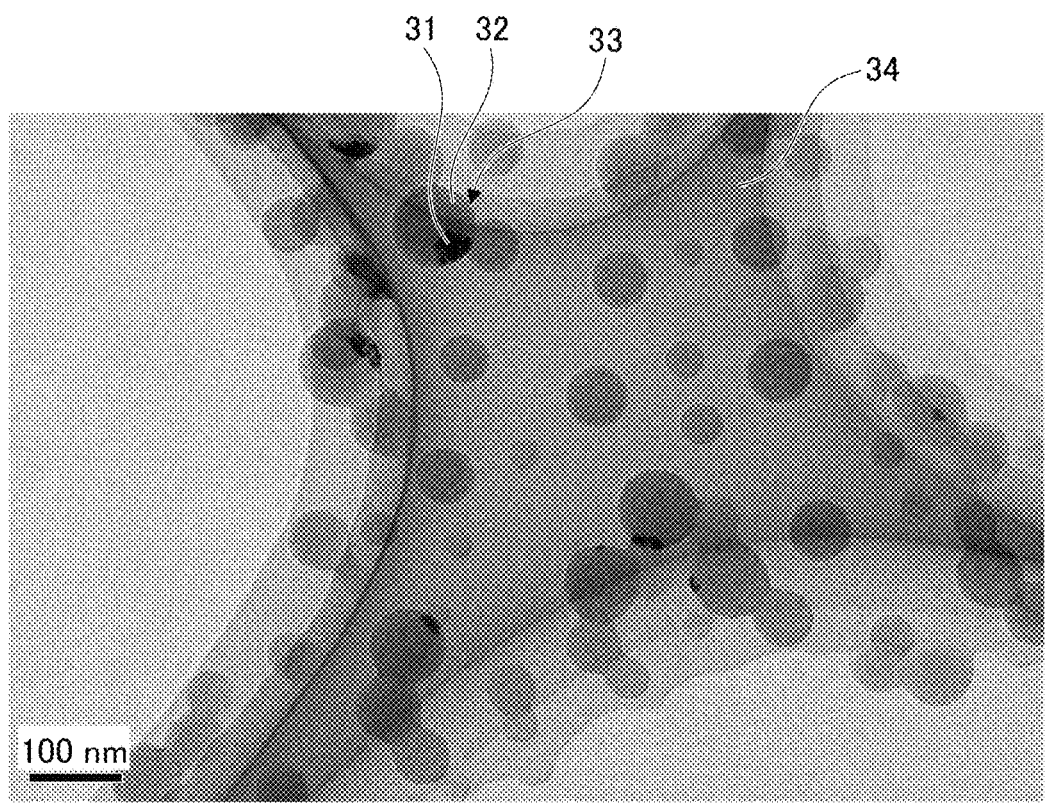
FIG. 3 is a transmission electron micrograph of organic-inorganic hybrid infrared absorbing particles obtained in Example 2.

The resulting dispersion liquid containing the organic-inorganic hybrid infrared absorbing particles was diluted and transferred to a microgrid to perform TEM observation of the transferred material. The TEM image is illustrated in FIG. 3. From the TEM image, it was confirmed that particles 31 containing the composite tungsten oxide, which are infrared absorbing particles, were embedded in a coating 32 of the polystyrene coating resin, and it was confirmed that organic-inorganic hybrid infrared absorbing particles 33 were formed. Although a microgrid 34 is also illustrated in FIG. 3, it does not constitute the organic-inorganic hybrid infrared absorbing particles.

Example 3

As a polymerization initiator, the dispersion liquid of the organic-inorganic hybrid infrared absorbing particles of Example 3 was obtained in the same manner as Example 1, except that 2,2'-azobis (2-methylpropionamidine) dihydrochloride (V-50) was used at a ratio equivalent of 0.5% by mol with respect to styrene instead of 0.5% by mol equivalent of 2,2'-azobis isobutyronitrile. In this case, the polymerization initiator was added to the aqueous phase.

Figure 4:
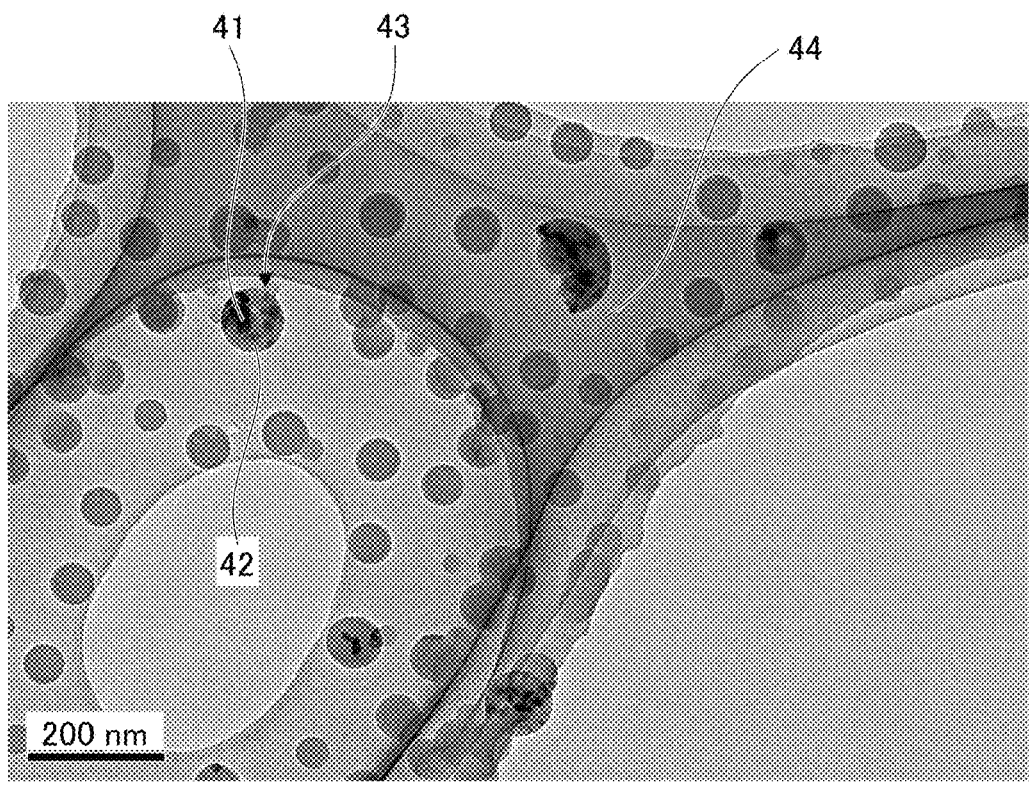
FIG. 4 is a transmission electron micrograph of organic-inorganic hybrid infrared absorbing particles obtained in Example 3.

The resulting dispersion liquid containing the organic-inorganic hybrid infrared absorbing particles was diluted and transferred to a microgrid to perform TEM observation of the transferred material. The TEM image is illustrated in FIG. 4. From the TEM image, it was confirmed that particles 41 containing the composite tungsten oxide, which are infrared absorbing particles, were embedded in a coating 42 of the polystyrene coating resin, and it was confirmed that organic-inorganic hybrid infrared absorbing particles 43 were formed. Although a microgrid 44 is also illustrated in FIG. 4, it does not constitute the organic-inorganic hybrid infrared absorbing particles.

The resulting dispersion liquid of the organic-inorganic hybrid infrared absorbing particles was diluted 50-fold with pure water, and the optical characteristics were measured. The transmittance of light in the visible light range at 550 nm was 29%, transmittance of light at 1000 nm was 50%, and transmittance of light at 1300 nm was 49%.

In addition, the resulting dispersion liquid of the organic-inorganic hybrid infrared absorbing particles (1 g) was added to 4 g of 0.01 mol/L sodium hydroxide solution held at 50° C., and the dispersion liquid was stirred for 60 minutes to perform an alkali resistance test. The dispersion liquid of the organic-inorganic hybrid infrared absorbing particles after the alkali resistance test was diluted 10-fold with pure water so as to be the same as the concentration before the alkali resistance test, and the optical characteristics were measured. The transmittance of light in the visible light range at 550 nm was 26%, transmittance of light at 1000 nm was 52%, and transmittance of light at 1300 nm was 50%, thus confirming that infrared absorption characteristics were retained.

The optical characteristics of the dispersion liquid of the organic-inorganic hybrid infrared absorbing particles were measured using a spectrophotometer (U-4100 manufactured by Hitachi, Ltd.) by placing the diluted dispersion liquid of the organic-inorganic hybrid infrared absorbing particles in a glass cell for measuring an optical path of 10 mm. The light incidence direction of the spectrophotometer was perpendicular to the measuring glass cell. In addition, a baseline of light transmittance was defined as a blank solution containing only pure water of a main solvent in the measuring glass cell.

Example 4

The additive amount of 2,2'-azobis (2-methylpropionamidine) dihydrochloride (V-50), which is a polymerization initiator, was changed to a ratio equivalent to 2.0% by mol with respect to styrene, and the dispersion liquid of the organic-inorganic hybrid infrared absorbing particles of Example 4 was obtained in the same manner as that of Example 3.

Figure 5A:
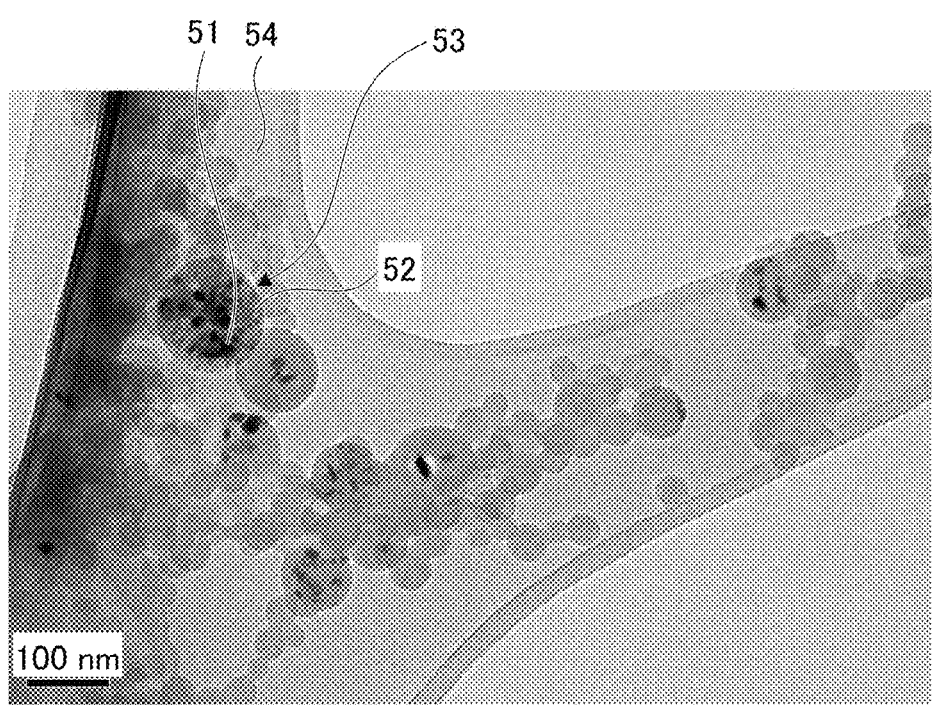
FIG. 5A is a transmission electron micrograph of organic-inorganic hybrid infrared absorbing particles obtained in Example 4.

The resulting dispersion liquid containing the organic-inorganic hybrid infrared absorbing particles was diluted and transferred to a microgrid to perform TEM observation of the transferred material. The TEM image is illustrated in FIG. 5A. From the TEM image, it was confirmed that particles 51 containing the composite tungsten oxide, which are infrared absorbing particles, were embedded in a coating 52 of the polystyrene coating resin, and it was confirmed that organic-inorganic hybrid infrared absorbing particles 53 were formed. Although a microgrid 54 is also illustrated in FIG. 5A, it does not constitute the organic-inorganic hybrid infrared absorbing particles.

In addition, the alkali resistance test of the resulting dispersion liquid of the organic-inorganic hybrid infrared absorbing particles and the evaluation of the optical characteristics before and after the alkali resistance test were performed in the same manner as Example 3. The results are indicated in Table 1.

Figure 5B:
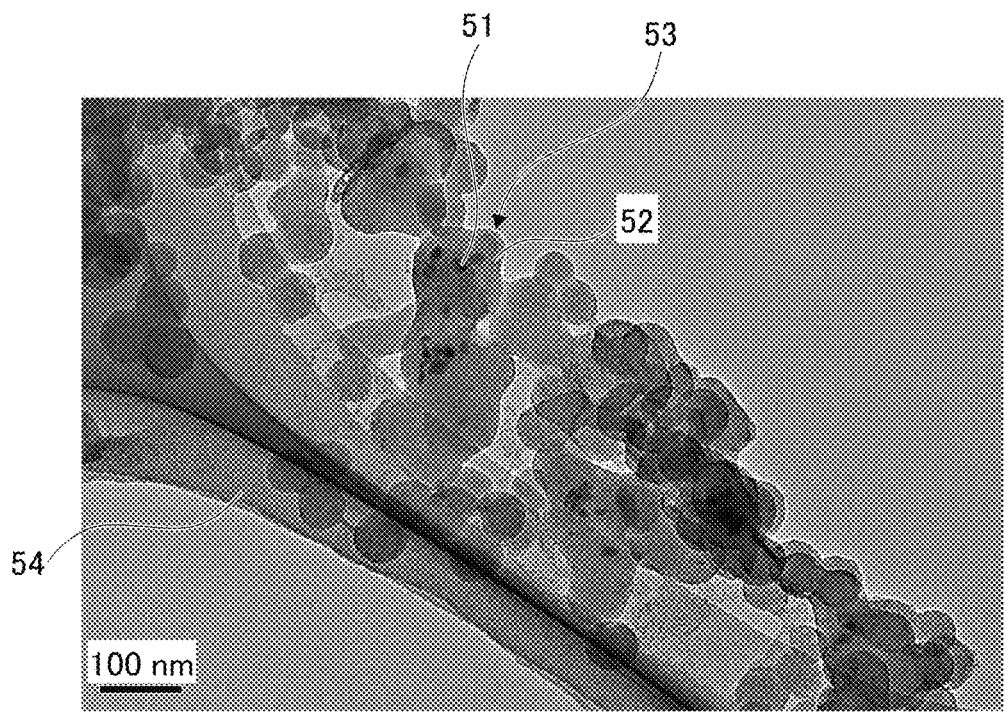
FIG. 5B is a transmission electron micrograph of the organic-inorganic hybrid infrared absorbing particles obtained in Example 4.

In FIG. 5B, the dispersion liquid containing the organic-inorganic hybrid infrared absorbing particles after the alkali resistance test was diluted and transferred to a microgrid to perform TEM observation of the transferred material. As illustrated in FIG. 5B, even after the alkali resistance test, it was confirmed that particles 51 containing the composite tungsten oxide that appeared black, which are infrared absorbing particles, were embedded in a coating 52 of the polystyrene that appeared gray, which is a coating resin, and it was confirmed that organic-inorganic hybrid infrared absorbing particles 53 were formed.

Although the microgrid 54 is also illustrated in FIGS. 5A and 5B, it does not constitute the organic-inorganic hybrid infrared absorbing particles.

Example 5

Cetyltrimethylammonium chloride was used as an emulsifying agent, and when mixing the emulsifying agent and water to form 10 g of the aqueous phase, the cetyltrimethylammonium chloride was added to water so as to be a concentration of 6.0 times of the critical micelle concentration. Except for the above points, the dispersion liquid of the organic-inorganic hybrid infrared absorbing particles of Example 5 was prepared in the same manner as Example 4.

Figure 6:
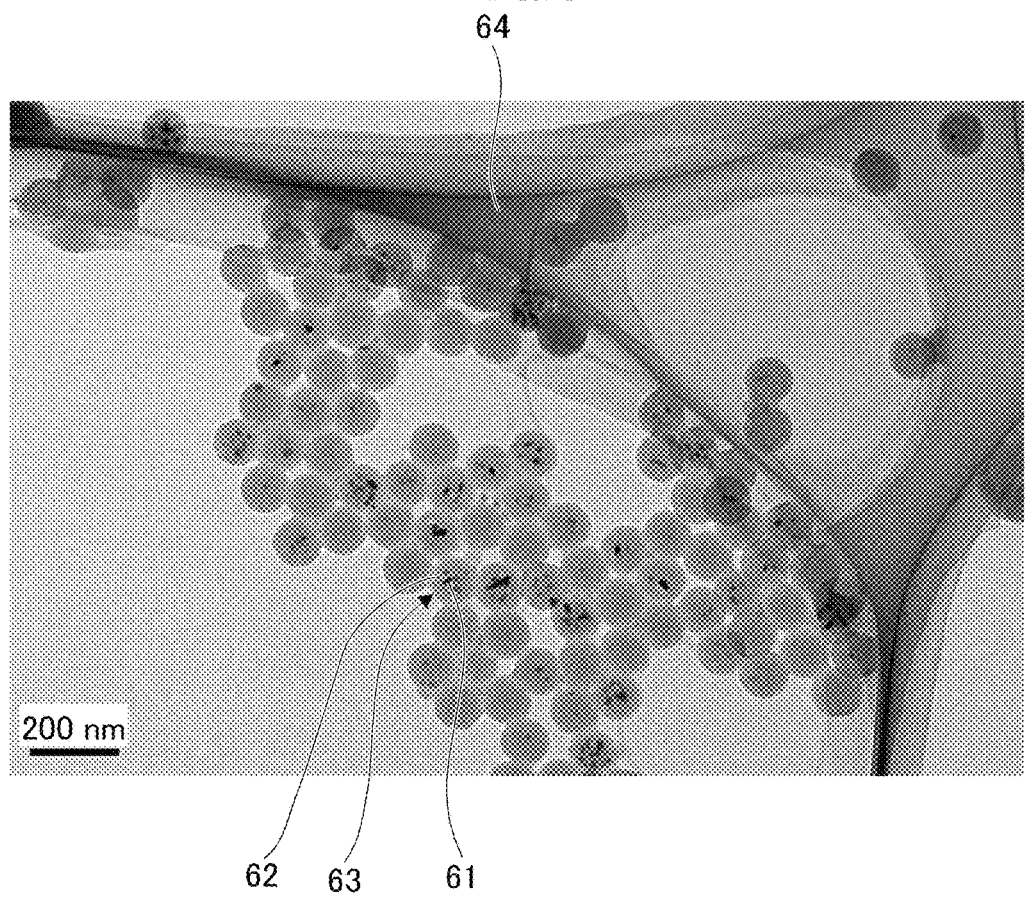
FIG. 6 is a transmission electron micrograph of organic-inorganic hybrid infrared absorbing particles obtained in Example 5.

The resulting dispersion liquid containing the organic-inorganic hybrid infrared absorbing particles was diluted and transferred to a microgrid to perform TEM observation of the transferred material. The TEM image is illustrated in FIG. 6. From the TEM image, it was confirmed that particles 61 containing the composite tungsten oxide, which are infrared absorbing particles, were embedded in a coating 62 of the polystyrene coating resin, and it was confirmed that organic-inorganic hybrid infrared absorbing particles 63 were formed. Although a microgrid 64 is also illustrated in FIG. 6, it does not constitute the organic-inorganic hybrid infrared absorbing particles.

In addition, the alkali resistance test of the resulting dispersion liquid of the organic-inorganic hybrid infrared absorbing particles and the evaluation of the optical characteristics before and after the alkali resistance test were performed in the same manner as Example 3. The results are indicated in Table 1.

Example 6

The dispersion liquid of the organicinorganic hybrid infrared absorbing particles of Example 6 was prepared in the same manner as Example 3, except that 2,2'-azobis (2-methyl-N-(2-hydroxyethyl)propionamidine) (VA-086) was used as the polymerization initiator at a ratio equivalent of 0.5% by mol with respect to styrene instead of using 2,2'-azobis(2-methylpropionamidine) dihydrochloride. In this case, the polymerization initiator was added to the aqueous phase.

Figure 7:
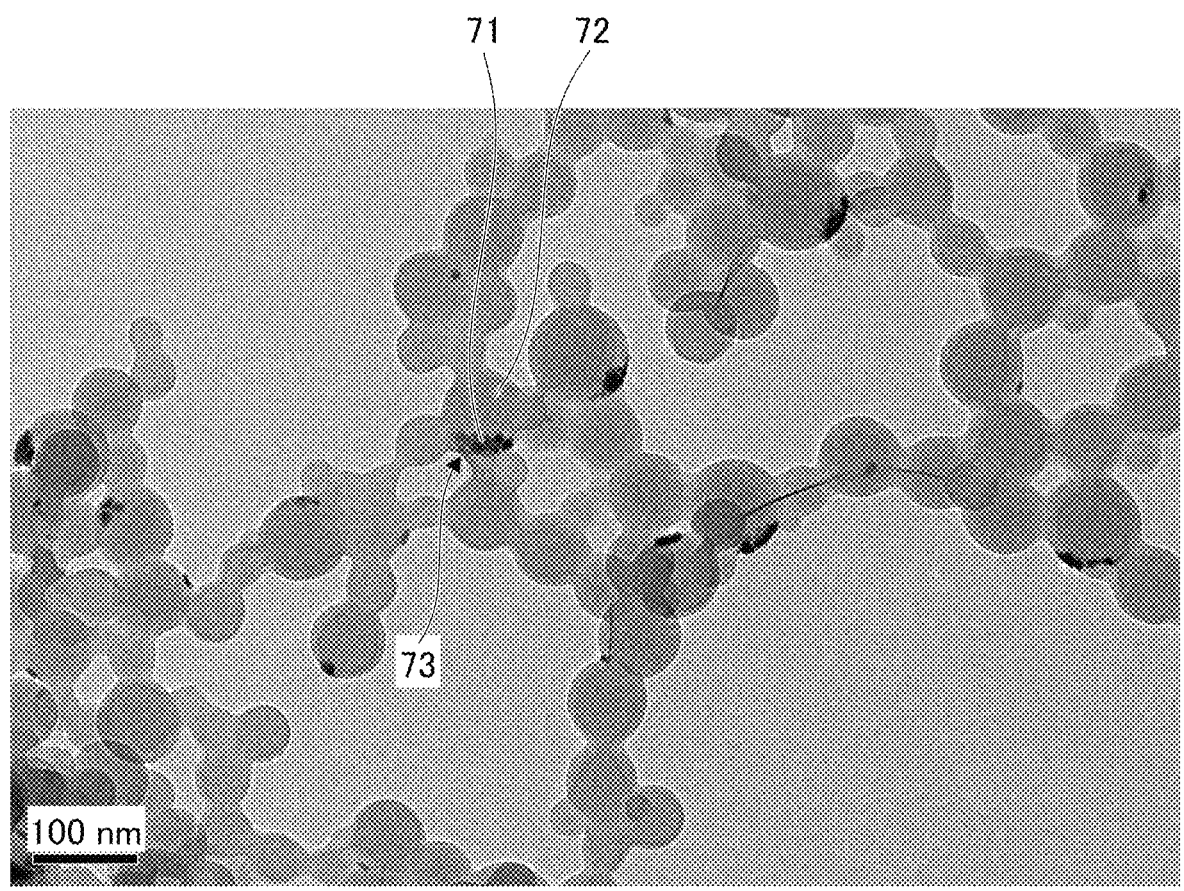
FIG. 7 is a transmission electron micrograph of organic-inorganic hybrid infrared absorbing particles obtained in Example 6.

The resulting dispersion liquid containing the organic-inorganic hybrid infrared absorbing particles was diluted and transferred to a microgrid to perform TEM observation of the transferred material. The TEM image is illustrated in FIG. 7. From the TEM image, it was confirmed that particles 71 containing the composite tungsten oxide, which are infrared absorbing particles, were embedded in a coating 72 of the polystyrene coating resin, and it was confirmed that organic-inorganic hybrid infrared absorbing particles 73 were formed.

Example 7

The dispersion liquid of the organic-inorganic hybrid infrared absorbing particles of Example 7 was obtained in the same manner as Example 5 except that the coating resin raw material was a mixture of 0.8 g of styrene and 0.2 g of divinylbenzene instead of 1.0 g of styrene.

Figure 8:
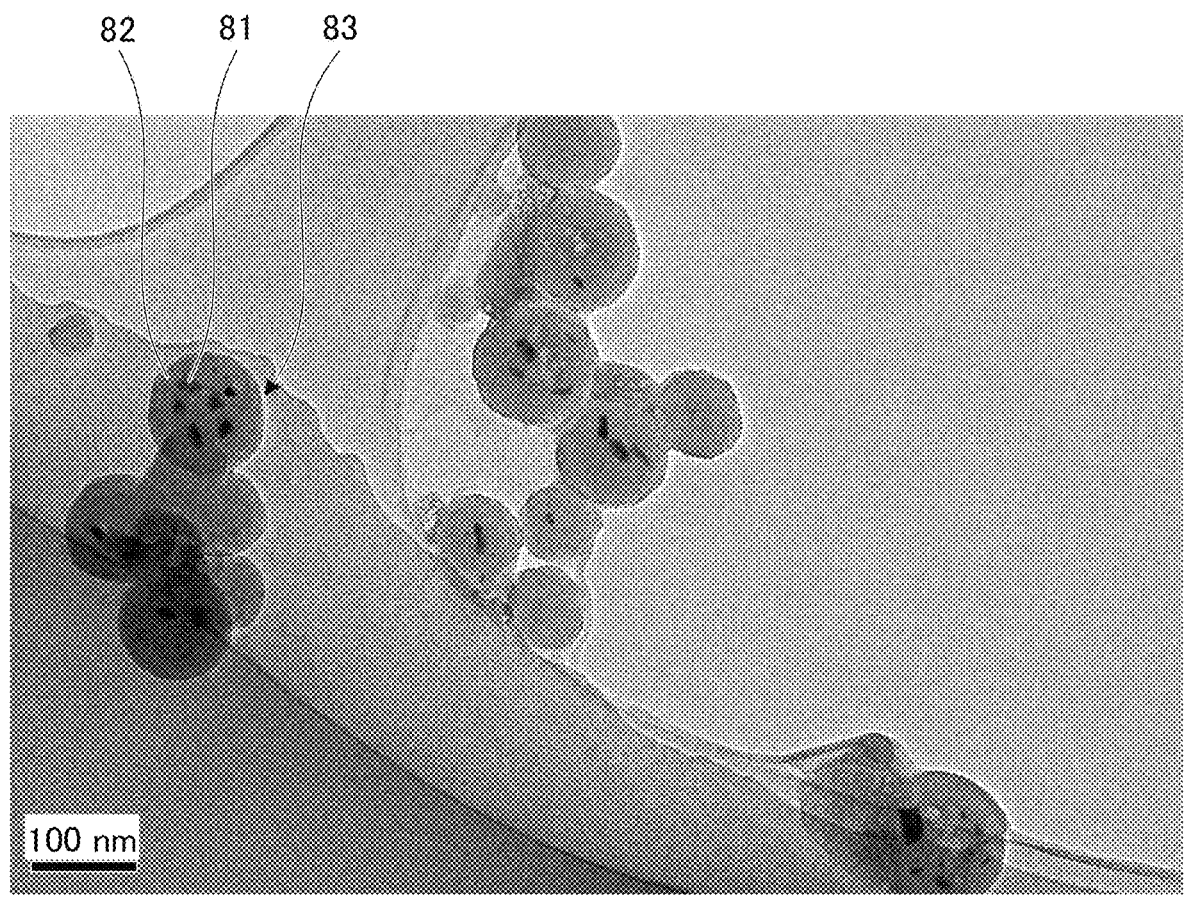
FIG. 8 is a transmission electron micrograph of organic-inorganic hybrid infrared absorbing particles obtained in Example 7.

The resulting dispersion liquid containing the organic-inorganic hybrid infrared absorbing particles was diluted and transferred to a microgrid to perform TEM observation of the transferred material. The TEM image is illustrated in FIG. 8. From the TEM image, it was confirmed that particles 81 containing the composite tungsten oxide, which are infrared absorbing particles, were embedded in a coating 82 of the poly(styrene-divinylbenzene), which is a coating resin, and it was confirmed that organic-inorganic hybrid infrared absorbing particles 83 were formed.

Comparative Example 1

In the dispersion liquid preparation step, a dispersion liquid containing infrared absorbing particles and a dispersion medium was prepared.

The infrared absorbing particles were prepared from a composite tungsten oxide powder (YM-01 manufactured by Sumitomo Metal Mining Co., Ltd.) containing hexagonal cesium tungsten bronze ($Cs_{0.33}WO_z$, $2.0 \leq z \leq 3.0$), in which the ratio of the mass of cesium (Cs) and tungsten (W) is Cs/W=0.33.

Pure water was used as the dispersion medium.

The mixture obtained by mixing 10% by mass of the infrared absorbing particles and 90% by mass of the dispersion medium was loaded into a paint shaker containing $ZrO_2$ beads having 0.3 mm φ, followed by being pulverized and dispersed for 10 hours to obtain the dispersion liquid of the $Cs_{0.33}WO_z$ particles according to Comparative Example 1.

Pure water in the dispersion medium was removed using an evaporator from the dispersion liquid of $Cs_{0.33}WO_z$ particles obtained in the raw material mixture preparation step, and infrared absorbing particles were collected. The collected infrared absorbing particles were formed as dry powder of $Cs_{0.33}WO_z$ particles.

The crystallite diameter of collected infrared absorbing particles, that is, $Cs_{0.33}WO_z$ particles, was 16 nm.

In calculating the crystallite diameter, an X-ray diffraction pattern was first measured by an X-ray powder diffraction method (θ-2θ method) using an X-ray powder diffraction device (X'Pert-PRO/MPD manufactured by Malvern Panalytical Ltd., Spectris). Then, the crystal structure contained in the infrared absorbing particles was identified from the obtained X-ray diffraction pattern, and the crystallite diameter was calculated using the Rietvelt method.

The dispersion liquid of $Cs_{0.33}WO_z$ particles according to Comparative Example 1 was used as the infrared absorbing particle dispersion liquid according to Comparative Example 1, and the alkali resistance test and the evaluation of the optical characteristics before and after the alkali resistance test were performed in the same manner as Example 3.

The resulting dispersion liquid of the infrared absorbing particles was diluted to 2,500-fold with pure water, and the optical characteristics were measured. The transmittance of light in the visible light range at 550 nm was 96%, transmittance of light at 1000 nm was 55%, and transmittance of light at 1300 nm was 44%.

Next, the dispersion liquid of the infrared absorbing particles according to Comparative Example 1 was diluted to 50-fold with pure water, and the resulting dispersion liquid of the infrared absorbing particles (1 g) were subjected to an alkali resistance test by adding to 4 g of 0.01 mol/L sodium hydroxide solution held at 50° C., and stirred for 60 minutes. The dispersion liquid of the infrared-absorbing particles after the alkali resistance test was diluted to 10-fold with pure water so as to be the same as the concentration before the alkali resistance test, and the optical characteristics were measured. The transmittance of light in the visible light range at 550 nm was 99%, transmittance of light at 1000 nm was 97%, and transmittance of light at 1300 nm was 96%, thus confirming that the infrared absorption characteristics were significantly degraded.

Comparative Example 2

Except that sodium dodecyl sulfate was used instead of dodecyl trimethylammonium chloride as the emulsifying agent, the procedure to obtain the dispersion liquid of the organic-inorganic hybrid infrared absorbing particles according to Comparative Example 2 was performed in the same manner as Example 3. However, salt was precipitated in the raw material mixture preparation step, the miniemulsion was not obtained in the stirring step, and the organic-inorganic hybrid infrared absorbing particles were not produced.

TABLE 1

| | Transmittance of dispersion liquid of the organic-inorganic hybrid infrared absorbing particles [%] | | | | | |
|---|---|---|---|---|---|---|
| | Before alkali resistance test | | | After alkali resistance test | | |
| | Wavelength 550 nm | Wavelength 1000 nm | Wavelength 1300 nm | Wavelength 550 nm | Wavelength 1000 nm | Wavelength 1300 nm |
| Example 3 | 29 | 50 | 49 | 26 | 52 | 50 |
| Example 4 | 23 | 44 | 45 | 22 | 48 | 50 |
| Example 5 | 3 | 18 | 29 | 3 | 18 | 27 |

TABLE 1-continued

| | Transmittance of dispersion liquid of the organic-inorganic hybrid infrared absorbing particles [%] | | | | | |
|---|---|---|---|---|---|---|
| | Before alkali resistance test | | | After alkali resistance test | | |
| | Wavelength 550 nm | Wavelength 1000 nm | Wavelength 1300 nm | Wavelength 550 nm | Wavelength 1000 nm | Wavelength 1300 nm |
| Comparative Example 1 | 96 | 55 | 44 | 99 | 97 | 96 |

From the evaluation results of the optical characteristics before and after the alkali resistance test of the dispersion liquid of the organic-inorganic hybrid infrared absorbing particles indicated in Table 1 above, it was confirmed that for the dispersion liquid using the organic-inorganic hybrid infrared absorbing particles of Examples 3 to 5, in which the coating resins were adhered to at least a portion of the surface of the infrared absorbing particles, there were no significant changes in the light absorption and transmission characteristics before and after immersion in the sodium hydroxide solution. Therefore, it was confirmed that the organic-inorganic hybrid infrared absorbing particles of Examples 3 to 5 have excellent alkali resistance, that is, excellent chemical resistance and excellent infrared absorption characteristics. Only alkali resistance tests were performed in this embodiment, but these organic-inorganic hybrid infrared absorbing particles also have acid resistance characteristics because a coating resin is adhered to at least a portion of the surface of the infrared absorbing particles.

As for the organic-inorganic hybrid infrared absorbing particles of Examples 1 and 2, as well as Examples 6 and 7, the coating resin is adhered to at least a portion of the surface of the infrared absorbing particles. Therefore, it can be said that the chemical resistance is excellent in the same manner.

In contrast, in the dispersion liquid using the infrared absorbing particles of Comparative Example 1, the infrared absorption characteristics disappeared after the alkali resistance test, and it was confirmed that the dispersion liquid did not have an alkali resistance.

Thus, although the method of producing the organic-inorganic hybrid infrared absorbing particles and the organic-inorganic hybrid infrared absorbing particles have been described in the embodiments, examples, or the like, the present invention is not limited to the above-described embodiments, Examples, or the like. Various modifications and variations are possible within the scope of the invention as defined in the claims.

This application claims priority under Japanese Patent Application No. 2018-236796 filed Dec. 18, 2018, and Japanese Patent Application No. 2019-094032 filed May 17, 2019. The entire contents of Japanese Patent Application No. 2018-236796 and Japanese Patent Application No. 2019-094032 are incorporated herein by reference.

DESCRIPTION OF THE REFERENCE NUMERALS 23, 33, 43, 53, 63, 73, and 83: Organic-inorganic hybrid infrared absorbing particles

The invention claimed is:

1. A method of producing organic-inorganic hybrid infrared absorbing particles comprising:
preparing a dispersion liquid containing infrared absorbing particles, a dispersant, and a dispersion medium;
removing the dispersion medium from the dispersion liquid by an evaporation;
preparing a raw material mixture liquid containing the infrared absorbing particles collected after the dispersion medium removing step, a coating resin material, an organic solvent, an emulsifying agent, water, and a polymerization initiator;
stirring the raw material mixture liquid while cooling; and
polymerizing the coating resin material after deoxygenation treatment which reduces an amount of oxygen in the raw material mixture liquid.

2. The method of producing the organic-inorganic hybrid infrared absorbing particles according to claim 1, wherein the dispersant is an amine compound.

3. The method of producing the organic-inorganic hybrid infrared absorbing particles according to claim 2, wherein the dispersant includes one or more polymeric materials selected from a long chain alkyl group and a benzene ring.

4. The method of producing the organic-inorganic hybrid infrared absorbing particles according to claim 3, wherein the emulsifying agent is a cationic surfactant.

5. The method of producing the organic-inorganic hybrid infrared absorbing particles according to claim 2, wherein the emulsifying agent is a cationic surfactant.

6. The method of producing the organic-inorganic hybrid infrared absorbing particles according to claim 2, wherein the amine compound is a tertiary amine.

7. The method of producing the organic-inorganic hybrid infrared absorbing particles according to claim 6, wherein the dispersant includes one or more polymeric materials selected from a long chain alkyl group and a benzene ring.

8. The method of producing the organic-inorganic hybrid infrared absorbing particles according to claim 7, wherein the emulsifying agent is a cationic surfactant.

9. The method of producing the organic-inorganic hybrid infrared absorbing particles according to claim 6, wherein the emulsifying agent is a cationic surfactant.

10. The method of producing the organic-inorganic hybrid infrared absorbing particles according to claim 1, wherein the dispersant includes one or more polymeric materials selected from a long chain alkyl group and a benzene ring.

11. The method of producing the organic-inorganic hybrid infrared absorbing particles according to claim 10, wherein the emulsifying agent is a cationic surfactant.

12. The method of producing the organic-inorganic hybrid infrared absorbing particles according to claim 1, wherein the emulsifying agent is a cationic surfactant.

13. The method of producing the organic-inorganic hybrid infrared absorbing particles according to claim 1,
wherein the infrared absorbing particles include one or more oxides selected from a tungsten oxide and a composite tungsten oxide,
wherein the tungsten oxide is represented by a general formula $WyOz$, wherein W represents tungsten, O represents oxygen, and $2.2 \leq z/y \leq 2.999$, wherein the composite tungsten oxide is represented by a general formula $M_xW_yO_z$, and wherein an element M is one or more elements selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Sb, B, F, P, S, Se, Br, Te, Ti, Nb, V, Mo, Ta, Re, Be, Hf, Os, Bi, and I, where $0.001 \leq x/y \leq 1$ and $2.0 \leq z/y \leq 3.0$.

* * * * *